UNITED STATES PATENT OFFICE 2,765,300
Patented Oct. 2, 1956

2,765,300

AZO PIGMENTS FROM DICHLOROTOLUIDINE SULFONIC ACIDS COUPLED TO BETA-OXY-NAPHTHOIC ACID

Delton William Hein, Somerville, N. J., George Raymond Waitkins, Kirkwood, Mo., and Harold Talbot Lacey, Westfield, N. J., assignors to American Cyanamid Company, New York, N. Y., a corporation of Maine No Drawing. Application April 7, 1953,
Serial No. 347,412

12 Claims. (Cl. 260—151)

The present invention refers to new pigments and, more especially, to new compounds of the formula:

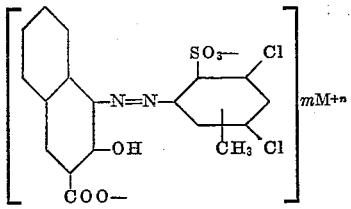

in which M is a metallic cation of $n$ positive charges and $m$ is the number of such cations, chosen so that $m$ times $n$ equals two.

One of the most important uses for high quality lacquers and enamels in the modern economy is for automotive finishes. Such lacquers and enamels must be made to withstand severe weathering. The pigments which go into them must possess certain critical qualities to a high degree. They must retain their color as much as possible under the severe weathering to which automobiles are subjected. This requires above all, a good fastness to light. It also requires resistance to chalking and bronzing. High transparency is also very desirable, particularly in the newer "metallic" finishes, and is a property difficult to obtain. The lacquer or enamel manufacturer requires that the pigments have good working properties in order that the pigment may be incorporated into the vehicle properly to produce a good coating.

Maroon, or dark red, is a popular color for automobiles, but it is not as popular as it could be. The well-informed automobile purchaser will avoid such a color because the cheaply available maroon pigments heretofore used, were not entirely satisfactory in some of these respects. Especially, they have tended to fade or otherwise change color in light and weather. They also have a tendency to bleed in solvents, such as are used for lacquers and enamels, and have a tendency to chalk and bronze badly. Further, products of high transparency were not available. This need for such cheap, easily manufactured maroon pigments of good properties has never been satisfactorily filled.

We have found that the metallic salts of azo pigments obtained by coupling an aminodichlorotoluene sulfonic acid of the structure:

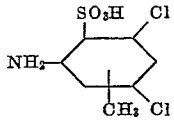

on 3-hydroxy-2-naphthoic acid are beautiful yellow-to-red coloring matters that combine in high degree the qualities of excellent working properties with high transparency, resistance to bleeding in solvents and resistance to the destructive action of light and weather in both enamel and lacquer finishes. Our new pigments retain their gloss and color values because they are slow to chalk, bronze, and fade.

The dichlorotoluidine sulfonic acids of the above formula can be prepared by reacting the corresponding dichlorotoluidines with chlorosulfonic acid in an organic solvent, followed by alkaline extraction of the precipitated product and reprecipitation with acid. The sulfonic acids thus obtained are diazotized, coupled with 3-hydroxy-2-naphthoic acid, and the products converted to metallic salts by methods known to the art. These are pigments of valuable yellow-to-red maroon and even violet-red shades.

Any metallic cation may be used for salt formation, although some are more valuable than others. The choice of metal exerts an appreciable influence on the shade and other properties of the product, and will depend on the application in view. Differences in shade are also to be seen between the products obtained from the two isomeric dichlorotoluidines using the same metal. Those from dichloroparatoluidine are, in general, deeper in shade than those from the dichloroorthotoluidine. It is thus an advantage of our invention that, by proper choice of isomeric starting material, combined with the proper metal, a wide range of colors of value are obtainable. Metals which have been found particularly advantageous are those forming divalent cations, especially the alkaline earth metals, such as calcium strontium, barium, and manganese.

While these products are very valuable pigments per se, they are not limited to use by themselves, but also serve as blending agents for other colors. They are of particular value when the starting dichlorotoluidines are blended in small amounts with other aromatic aminosulfonic acids and aromatic amines, such as dichloroaniline sulfonic acids, aminonaphthalene sulfonic acids, chlorotoluidine sulfonic acids, aniline sulfonic acids, toluidines and naphthylamines, and co-coupled with beta-oxynaphthoic acid as the coupling component.

The present invention is described in further detail in the following examples. Parts are by weight unless otherwise specified.

EXAMPLE 1

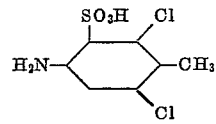

Twenty parts of 3,5-dichloro-4-methylaniline is dissolved in 195 parts of dichlorobenzene. This solution is stirred, and 12.6 parts of chlorosulfonic acid are added slowly, the temperature being permitted to rise to about 70° C. The thick slurry is diluted with 26 parts of dichlorobenzene, and the mixture is heated gradually to a temperature of about 170° C. until the reaction is substantially complete. The mixture is cooled to room temperature, and the product is isolated by filtration and washing successively with dichlorobenzene. The crude product is dissolved in dilute sodium hydroxide, and the solution is treated with 10 parts of charcoal followed by clarification. The filtrate is acidified with concentrated hydrochloric acid, and the precipitated 2-amino-4,6-dichloro-5-methylbenzene sulfonic acid is filtered, washed, and dried.

EXAMPLE 2

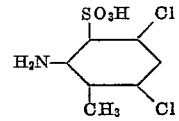

Twenty parts of 3,5-dichloro-6-methylaniline, 260 parts of dichlorobenzene, and 13 parts of chlorsulfonic acid are mixed as described in Example 1. The reaction is carried out in the same manner as in that example, and the product is purified by alkaline solution and charcoal treatment. A good yield of 2-amino-4,6-dichloro-3-methylbenzene sulfonic acid is obtained.

EXAMPLE 3

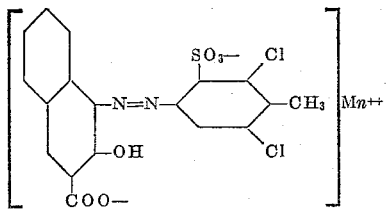

Two and fifty-six hundredths parts of the product of Example 1 is dissolved in 30 parts of water and 2.3 parts of 20% sodium hydroxide solution. The solution is cooled to 0° C. and acidified with 7.5 parts of 20% hydrochloric acid solution. The mixture is then diazotized by the gradual addition of 10 parts of a normal solution of sodium nitrite. The mixture is stirred at 0–2° C. until the reaction is substantially complete. Four and five-tenths parts of manganous chloride tetrahydrate is dissolved in 20 parts of water, and this solution is added to the above prepared diazo slurry. A separate solution of 2.13 parts of 2-hydroxy-3-naphthoic acid dissolved in 100 parts of water, 3.9 parts of 20% sodium hydroxide solution, and 15 parts of 20% sodium acetate solution is cooled to 15° C. The diazo slurry is added gradually to the hydroxynaphthoic acid solution at 13–15° C. Four parts of 20% sodium hydroxide solution is added, and the mixture is stirred until the coupling is complete. The cherry-maroon colored product is isolated by filtration and washing. A softer product can be obtained by heating the coupling mixture with a small amount of crude abietic acid before isolating.

EXAMPLE 4

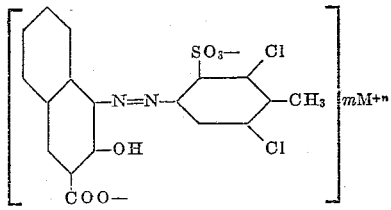

Metallic salts were prepared from other metals by substituting the proper salts for the manganous chloride. The colors obtained are listed as follows:

| Metallic Cation | Color |
| --- | --- |
| Calcium | Bright maroon. |
| Magnesium | Scarlet red. |
| Strontium | Do. |
| Barium | Dark maroon. |
| Zinc | Do. |
| Cadmium | Scarlet red. |
| Cupric | Violet red. |
| Ferrous | Dark violet red. |
| Nickelous | Deep maroon. |
| Plumbic | Do. |
| Aluminum | Bright scarlet red. |
| Zirconic | Light red. |
| Titanic | Yellowish red. |
| Ferric | Violet brown. |

EXAMPLE 5

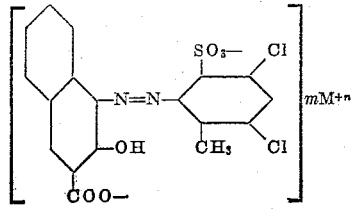

Two and fifty-six hundredths parts of the product of Example 2 is diazotized, mixed with a metal salt, coupled on 2-hydroxy-3-naphthoic acid, and the product isolated as in Example 3. The colors obtained with the various metals are listed in the following table:

| Metallic Cation | Color |
| --- | --- |
| Manganous | Bright red. |
| Calcium | Orange red. |
| Magnesium | Yellowish red. |
| Strontium | Do. |
| Barium | Do. |
| Zinc | Reddish yellow. |
| Cadmium | Yellowish red. |
| Cupric | Yellowish brown. |
| Ferrous | Do. |
| Nickelous | Do. |
| Plumbic | Bright orange red. |
| Aluminum | Yellowish red. |
| Zirconic | Reddish yellow. |
| Titanic | Yellow red. |
| Ferric | Do. |

We claim:
1. Compounds of the formula:

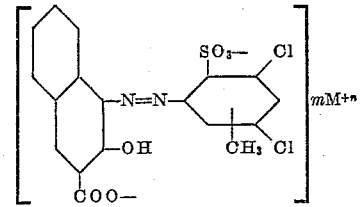

in which M is a metallic cation of $n$ positive charges, and $m$ is the number of such cations chosen so that $m$ times $n$ equals two, $n$ being a whole number greater than 1.

2. Compounds of the formula:

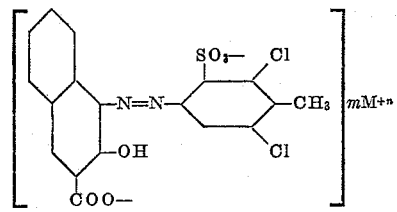

in which M is a metallic cation of $n$ positive charges, and $m$ is the number of such cations chosen so that $m$ times $n$ equals two, $n$ being a whole number greater than 1.

3. Compounds of the formula:

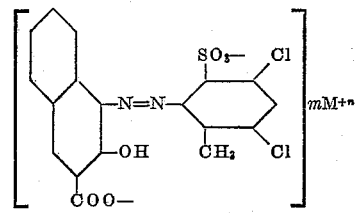

in which M is a metallic cation of $n$ positive charges, and $m$ is the number of such cations chosen so that $m$ times $n$ equals two, $n$ being a whole number greater than 1.

4. The compound according to claim 2 in which M is a divalent metallic cation.

5. The compounds according to claim 4 in which M is an alkaline earth metal ion.

6. Compounds according to claim 5 in which M is a calcium ion.

7. Compounds according to claim 4 in which M is a manganese ion.

8. The compound according to claim 4 in which M is a nickel ion.

9. The compound according to claim 3 in which M is a divalent metallic cation.

10. The compounds according to claim 9 in which M is an alkaline earth metal ion.

11. The compound according to claim 10 in which M is a calcium ion.

12. The compound according to claim 9 in which M is a manganese ion.

References Cited in the file of this patent

UNITED STATES PATENTS

| | | |
|---|---|---|
| 787,767 | Julius et al. | Apr. 18, 1905 |
| 938,486 | Ernst et al. | Feb. 7, 1911 |
| 1,815,747 | Wagner | July 21, 1931 |